(12) United States Patent
Zyryanov

(10) Patent No.: US 7,461,475 B2
(45) Date of Patent: Dec. 9, 2008

(54) DEVICE WITH AN AUTOMATIC STRIKE PREFERABLY USABLE FOR FISHING

(76) Inventor: Aleksandr Zyryanov, 2012 Harris Ave., Sacramento, CA (US) 95838

( * ) Notice: Subject to any disclaimer, the term of this patent is extended or adjusted under 35 U.S.C. 154(b) by 0 days.

(21) Appl. No.: 11/545,966

(22) Filed: Oct. 10, 2006

(65) Prior Publication Data

US 2008/0083151 A1    Apr. 10, 2008

(51) Int. Cl.
*A01K 97/11* (2006.01)
(52) U.S. Cl. .......................................................... 43/15
(58) Field of Classification Search .................. 43/15, 43/16
See application file for complete search history.

(56) References Cited

U.S. PATENT DOCUMENTS

| | | | | |
|---|---|---|---|---|
| 1,524,001 A | * | 1/1925 | Minich | 241/301 |
| 1,975,385 A | * | 10/1934 | Bachus | 242/252 |
| 2,009,736 A | * | 7/1935 | Kornichuk | 43/15 |
| 2,303,668 A | * | 12/1942 | Tilbury | 242/252 |
| 2,567,340 A | * | 9/1951 | Lytle | 43/15 |
| 2,591,204 A | * | 4/1952 | Schnepel | 242/252 |
| 2,871,614 A | * | 2/1959 | Roff | 43/15 |
| 3,459,387 A | * | 8/1969 | Miyamae | 242/225 |
| 3,834,055 A | * | 9/1974 | Bianco | 43/15 |
| 3,852,905 A | * | 12/1974 | Webb | 43/15 |
| 4,142,315 A | * | 3/1979 | Hoffman | 43/15 |
| 4,449,317 A | * | 5/1984 | Brodribb et al. | 43/15 |
| 5,802,758 A | * | 9/1998 | Frehling | 43/15 |

* cited by examiner

*Primary Examiner*—Kurt Rowan
(74) *Attorney, Agent, or Firm*—Aleksandr Smushkovich

(57) ABSTRACT

A device embodiment comprises a fishing rod; a regular and additional reel rotatable by a handle; a mechanism including a ratchet wheel, a string-lever rotatable about a lever axis, a spring-lever rotatable about the lever axis connecting the levers, an orifice in the string-lever, a tongue fixed on the string-lever, a spring attached to the spring-lever remotely to the tongue, a regulative means to vary dispositions between the levers, spring, and string; wherein all the mechanism's elements are so configured that tend to disengage the tongue from the wheel's teeth; a string woundable on the additional reel by revolving the handle and tied to the rod's free end, which string is threaded through the orifice so that capable to engage the tongue with the wheel's teeth while said string being stretched between the additional reel and the rod's free end. Other embodiments may be modified for traps, anti-theft, alarm systems.

1 Claim, 1 Drawing Sheet

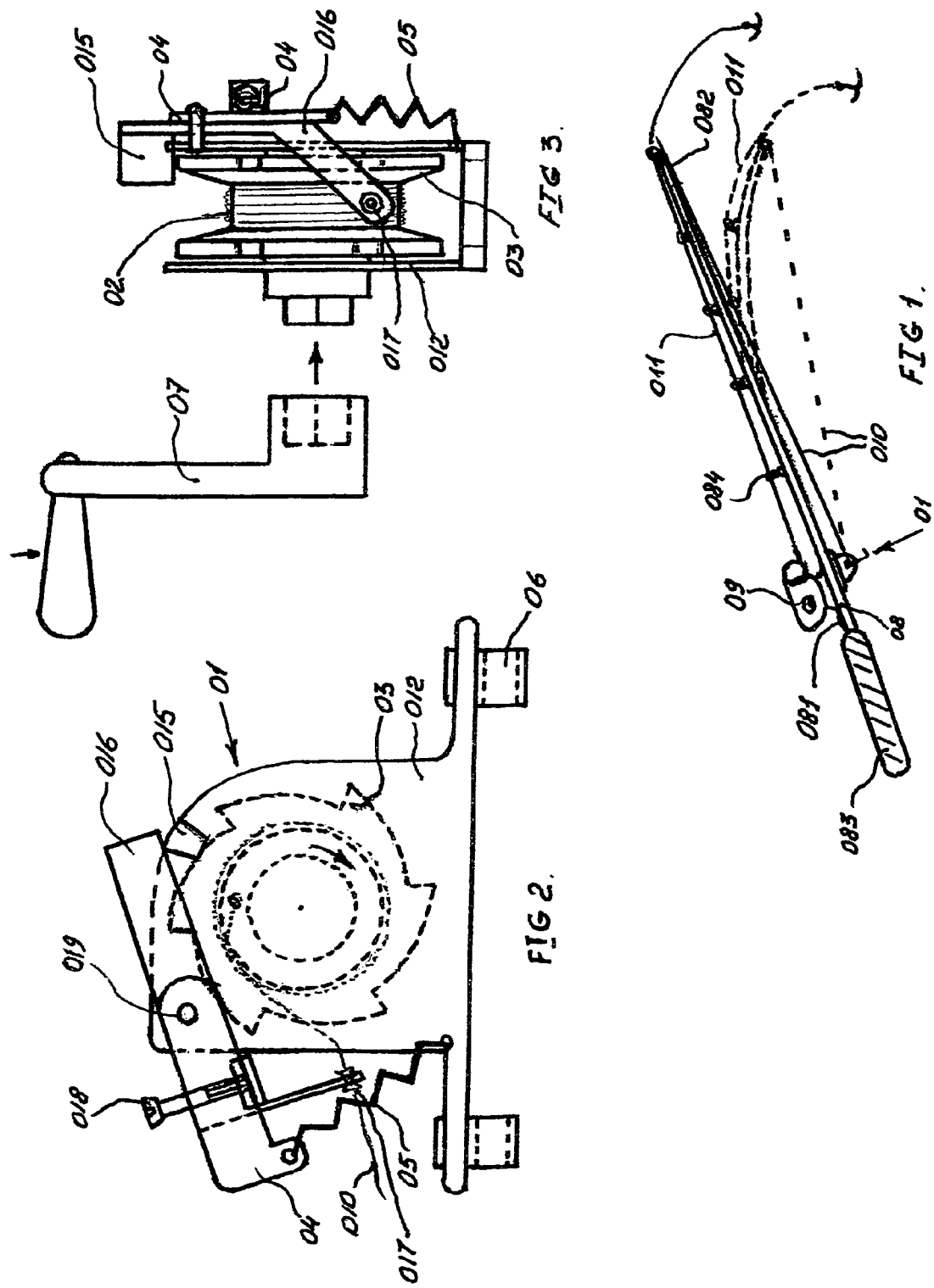

DEVICE WITH AN AUTOMATIC STRIKE PREFERABLY USABLE FOR FISHING

BACKGROUND OF THE INVENTION

The present invention relates to devices capable to strike automatically in response to an application of a slight mechanical impact or a touch, particularly usable for fishing, and making traps, e.g. for mice, birds, etc.

Prior art describes various kinds of fishing tackle. Some of them provide automatic functions enabled by different means. For instance, U.S. Pat. No. 6,594,940, hereby entirely incorporated by reference, describes a complicated device of such a type with a fishing rod holder pivotable about a first and a second pivot axis, and a trigger means, allowing the fishing rod to move from a cocked to a released position. That patent also analyzes several prior art patents, mostly including spring-loaded members and mechanisms substantially employed to strike the fish after it takes the bait. Particularly the analysis shows that those prior art inventions have "the disadvantage, that the force required to trigger the fish hooking device and the force for setting the hook is substantially equal because these forces are generated by the same spring".

A similar problem often exists in different constructions using spring-loaded triggering devices, e.g. a trap for a mouse, or other animals.

BRIEF SUMMARY OF THE INVENTION

An aim of the present invention is to provide a novel device, preferably usable for fishing, capable to automatically and efficiently release its potential energy, for instance, for striking fish by a fishing rod, after the fish takes the bait.

Other aims of the invention will become apparent from a consideration of the drawings, ensuing description, and claims as hereinafter related.

An embodiment of the inventive device enables the fishing rod to strike the fish while the rod is either being fixed in a holder, or being held by hand. Other embodiments may be designed so that the rod can only be fixed in a holder, or only be held by hands.

A preferred embodiment of the inventive device comprises a fishing rod with a first end fixed to a rod-handle and a second free end; a fishing line passing through guides fixed to the rod and extending through the free end of the rod; a regular spinning reel for the fishing line fixed on the rod, a spool mounted in a housing fixed to the rod on the opposite side of the rod; a handle capable to rotate the spool; a ratchet mechanism including a ratchet wheel, an elongated string-lever pivotally mounted in the housing and rotatable about a lever axle, a spring-lever rotatable about the lever axle, thereby connected to the string-lever by the lever axle, an orifice made in the string-lever, a tongue arranged on a first end of the string-lever, a ratchet spring attached to an end of the spring-lever remote to the position of the tongue, a regulative means capable to vary dispositions between the string-lever, the spring-lever, the spring, and the string; the regulative means, the spring and both the levers are so configured that tend to disengage the tongue from a corresponding tooth of the ratchet wheel; a suitable string (or a rope) capable to be wound on the spool by revolving the handle and tied to the free end of the rod, which string is threaded through the orifice so that capable to engage the tongue with a corresponding tooth of the ratchet wheel while being stretched between the spool and the free end of the rod.

BRIEF DESCRIPTION OF THE DRAWINGS

FIG. 1 is a general view of the inventive fishing device, according to an embodiment of the present invention.

FIG. 2 is a detail front view of the additional reel and the ratchet mechanism, according to the embodiment of the present invention shown on FIG. 1.

FIG. 3 is a detail side view of the spool and the ratchet mechanism, according to the embodiment of the present invention shown on FIG. 1.

DESCRIPTION OF A PREFERRED EMBODIMENT OF THE INVENTION

While the invention may be susceptible to embodiment in different forms, there is shown in the drawings, and will be described in detail herein, a specific embodiment of the present invention, with the understanding that the present disclosure is to be considered an exemplification of the principles of the invention, and is not intended to limit the invention to that as illustrated and described herein.

As illustrated on FIG. 1, a preferred embodiment of the device comprises an elongated fishing rod (08), having a first end (081) attached to a rod-handle (083) and a second free end (082). A number of passing guides (084), preferably more than one, are mounted on the rod 08. It is preferable to have one such guide 084 installed in the region of the free end 082 so that the free end of the line 011 is passed through such ending guide.

The preferred embodiment of the device comprises a regular spinning reel (09) fixed to the rod 08 as shown on FIG. 1. A regular fishing line (011) is threaded through the guides 084. A first end of the line 011 is fixed to the regular reel 09, and a second free end of the line 011 is threaded through the aforesaid ending guide.

The preferred embodiment of the device comprises an inventive unit (01) including a spool (02) as shown on FIG. 1, 2. The spool 02 is rotatably mounted in a housing (012), which housing 012 is attached to the rod 08 by brackets (06). FIGS. 2 and 3 illustrate in detail the composition of the unit 01.

The unit 01 includes a handle (07), shown on FIG. 3 in its dissembled position. In its assembled position the handle 07 is capable to revolve the spool 02.

The unit 01 includes a ratchet mechanism (see FIG. 2, 3) comprising a ratchet wheel (03), coupled to the spool 02, and having a number of teeth (preferably more than one) of a proper shape.

The unit 01 includes an elongated string-lever (016), pivotally mounted in the housing 012, that is capable to turn within the limit of a predetermined maximal angle about an axle (019), which axle 019 is mounted in a hole of the housing 012 substantially transverse to a longitudinal axe of the lever 016. The lever 016 has a hand positioned inwardly, substantially above the spool 02, and extending at a constructively suitable angle from the longitudinal axe of lever 016. An orifice (017) is made in the hand of lever 016. The lever 016 has a square shaped solid shelf positioned outwardly.

The lever 016 is furnished with a tongue (015) of a proper shape, coupled to a first end of the lever 016. The tongue 015 is so configured that may be engaged with a corresponding tooth of the ratchet wheel 03 thereby preventing the wheel 03 (and thusly the spool 02) from revolving in one direction, e.g. counter-clockwise, but allowing the wheel 03 to revolve in the other direction, that is clockwise in the given example (shown on FIG. 2).

The unit 01 includes a spring-lever (04) pivotally mounted in the housing 012, capable to turn about the axle 019. The lever 04 has a shelf, positioned outwardly to the spool 02, which shelf has in its center a hole with screw threads.

The unit 01 includes a ratchet spring (05). The upper end of the spring 05 is attached to an end of the lever 04, which lever's end is oppositely positioned to the tongue 015. The lower end of the spring 05 is attached to the bottom of the housing 012. In this embodiment, the spring 05 is normally expanded, and tends to turn the lever 04 counter-clockwise.

The preferred embodiment of the device comprises a suitable string (010) woundable on the spool 02 by revolving the handle 07, which string 010 is tied preferably to the free end 082 of the rod, as illustrated on FIG. 1, and the string 010 is tied to the spool 02 by the other end. The string 010 is threaded through the orifice 017 so that capable to engage the tongue 015 with a corresponding tooth of the ratchet wheel 03 while being predeterminedly stretched between the spool 02 and the free end 082, and thereby applying a downward pressure to the portion of the lever 016 coupled with the tongue 015, and an upward pressure to the opposite end of the lever 016. Due to the special shapes of the tongue 015 and the teeth of wheel 03, this permits to revolve the wheel 03 clockwise, but blocks the counter-clockwise rotation of the wheel 03.

The unit 01 includes a regulative means, made, for example, in the form of a bolt (018) capable to be downwardly screwed into the hole of the shelf mounted on the lever 04, which hole has the aforesaid screw threads, as depicted on FIG. 2. The lower end of the bolt 018 contacts the solid shelf of the lever 016. Thereby the bolt 018 provides an intermediate connection between the levers 04 and 016, which enables to regulate a minimal upward pressure exerted by the string 010 onto the lever 016.

The minimal upward pressure still permits the tongue 015 to engage with a corresponding tooth of the ratchet wheel 03. Therefore, upward and downward regulative displacements of the bolt 018 allow changing the minimal pressure required for the string 010 to keep the engagement of the tongue 015 and the teeth of the wheel 03. In the other words, the displacements allow setting a minimum stretching force of the string 010 capable to prevent the wheel 03 from rotating counter-clockwise in the given example.

OPERATION OF THE PREFERRED EMBODIMENT OF THE INVENTION

After the fishing line 011 is suitably extended and set for fishing (position shown on FIG. 1 by solid lines), the fisherman winds up the string 010 onto the spool 02 by means of the handle 07, thereby bending the rod 08, especially its portion in the region close to the free end 082 (position shown on FIG. 1 by dashed lines). During the winding the wheel 03 is rotated, e.g. clockwise, as in the given example reflected on FIG. 2. The rod 08 is bent downwardly (see FIG. 1). The stretching of the string 010 creates the upward pressure applied to the left portion of the lever 016 (as illustrated on FIG. 2) that engages the tongue 015 with a corresponding tooth of wheel 03.

The fisherman may hear the clicking sounds made by the tongue 015 touching the teeth of wheel 03. For example, the fisherman may set the stretching force of the string 010 corresponding to two clicks. As discussed above, the position of the bolt 018 sets the minimum stretching force of the string 010 that substantially determines the particular stretching force corresponding to the first click.

Then he may hold the rod 08 in his hands, or alternatively may fix it in a proper holder (not shown herein) for the rod. When the fish takes the bait, it pulls the fishing line 011 downwards. The fishing line 011 additionally bends the rod 08 that weakens the stretching of the string 010, reducing the upward pressure applied to the left portion of the lever 016.

If the upward pressure reduces below the aforesaid minimal upward pressure, the spring 05 causes the lever 04 and the lever 016 (by the force transmitted via the bolt 018) to turn counter-clockwise, i.e. disengage the tongue 015 from the corresponding tooth of wheel 03, releasing the spool 02 and permitting its rotation counter-clockwise caused by the stretching of the string 010. This sharply springs up the rod 08 in the vicinity of the free end 082, unbending the rod and strikes the line 011 with the hook and the fish. The strike occurs automatically, and does not require any action from the fisherman.

As discussed hereinabove, by setting the initial position of the bolt 018, the fisherman may change the minimum stretching required to strike the fish, that is effectively set the triggering pulling force to be made by the fish. This allows tuning the device for fishing smaller or larger fish depending on the desire of the fisherman and particular requirements of fishing regulations.

OTHER RAMIFICATIONS AND APPLICATIONS OF THE INVENTIVE DEVICE

Other embodiments may have the lever's hand, shelves, pivotal axle, the lever's longitudinal axe, and the hand's angle positioned or configured differently than depicted in FIG. 2, 3. Some embodiments may not contain the regulative means, that is the predetermined minimal force can be preset only by changing the number of clicks heard by the fisherman during the winding up of the string. The string may also be tied not the very end of the rod, but slightly lower, to use the wider portion of the rod. This allows reducing the sensitivity of the device, and starts the strike at a greater pulling force applied by the fish.

The regulative means and the levers may be implemented in different forms. For instance, the levers 04 and 016 may be combined in one solid lever, whereas the spring 05 may be eliminated. The regulative means may include a bolt having a hole drilled inside the bolt. The bolt is screwed into a housing shelf fixed to the housing (the housing shelf has a properly screw-threaded hole). A spring is inserted into the bolt's hole with its upper end. The lower end of the spring is supported by a solid lever's shelf and suitably fixed to it. The solid lever also has an orifice, through which the string is threaded. The string, while being stretched as instructed above, causes the tongue to engage with the ratchet wheel's teeth.

As already mentioned above, this principle may be applied to designing of various traps for animals, or maybe birds. The regulative means may enable setting the proper triggering force of the device, which can be attributed to certain types of animals or birds. This might allow substantially selecting a particular type or size of the animal (bird) to be trapped into. Additionally, the principle may be implemented for constructing of new types of bow, in alarm and anti-theft systems, etc.

It will be understood that each of the elements described above or a combination thereof may also be applied in other types of apparatus and methods differing from the described above. Nevertheless, the invention is not intended to be limited to the details illustrated herein, since various modifications and structural changes may be made without departing in any way from the spirit of the present invention.

I claim:
1. A fishing device comprising:
- an elongated bendable fishing rod including a rod handle, said rod having a first end fixed to the rod handle and a second free end;
- a spinning reel mounted on said rod on a first side and having a fishing line attached thereto, said fishing line extending from said spinning reel through said second free end of the fishing rod to a baited hook;
- a housing containing a spool mounted on said fishing rod on a second side of said rod opposite said spinning reel;
- a rotatable handle mounted to said housing to rotate said spool;
- a ratchet mechanism attached to said housing and including a ratchet wheel coupled to said spool, said ratchet wheel containing a plurality of teeth;
- an axle mounted on said housing, said spool and said ratchet wheel mounted on said axle and rotatable by said rotatable handle;
- an elongated string lever pivotally mounted to said housing and rotatable about an axis, said string lever having a tongue on a first end of said string lever, said tongue engaging a tooth on said ratchet wheel, and an orifice at another end;
- a spring lever pivotally mounted to the housing on said axis;
- a ratchet spring having two ends, with one end attached to an opposite end of said spring lever from said tongue, and said ratchet spring having an opposite end attached to said housing;
- regulative means, comprising a bolt, in contact with both said string lever and said spring lever, said bolt capable of varying the dispositions between said levers;
- a string having two ends, fixedly attached at one end to the free end of said fishing rod, and woundable on said spool at another end by rotation of said handle causing said fishing rod to bend;
- said string passing through said orifice of said string lever;
- whereby when a fish strikes, pulling the fishing line downwardly, the fishing rod bends further, reducing the pressure on said string such that force from said ratchet spring causes said levers to rotate to disengage the tongue from a tooth on said ratchet wheel, which allows rotation of said spool and the rapid upward movement of the free end of the fishing rod to set the hook.

* * * * *